United States Patent Office 3,100,491
Patented Aug. 13, 1963

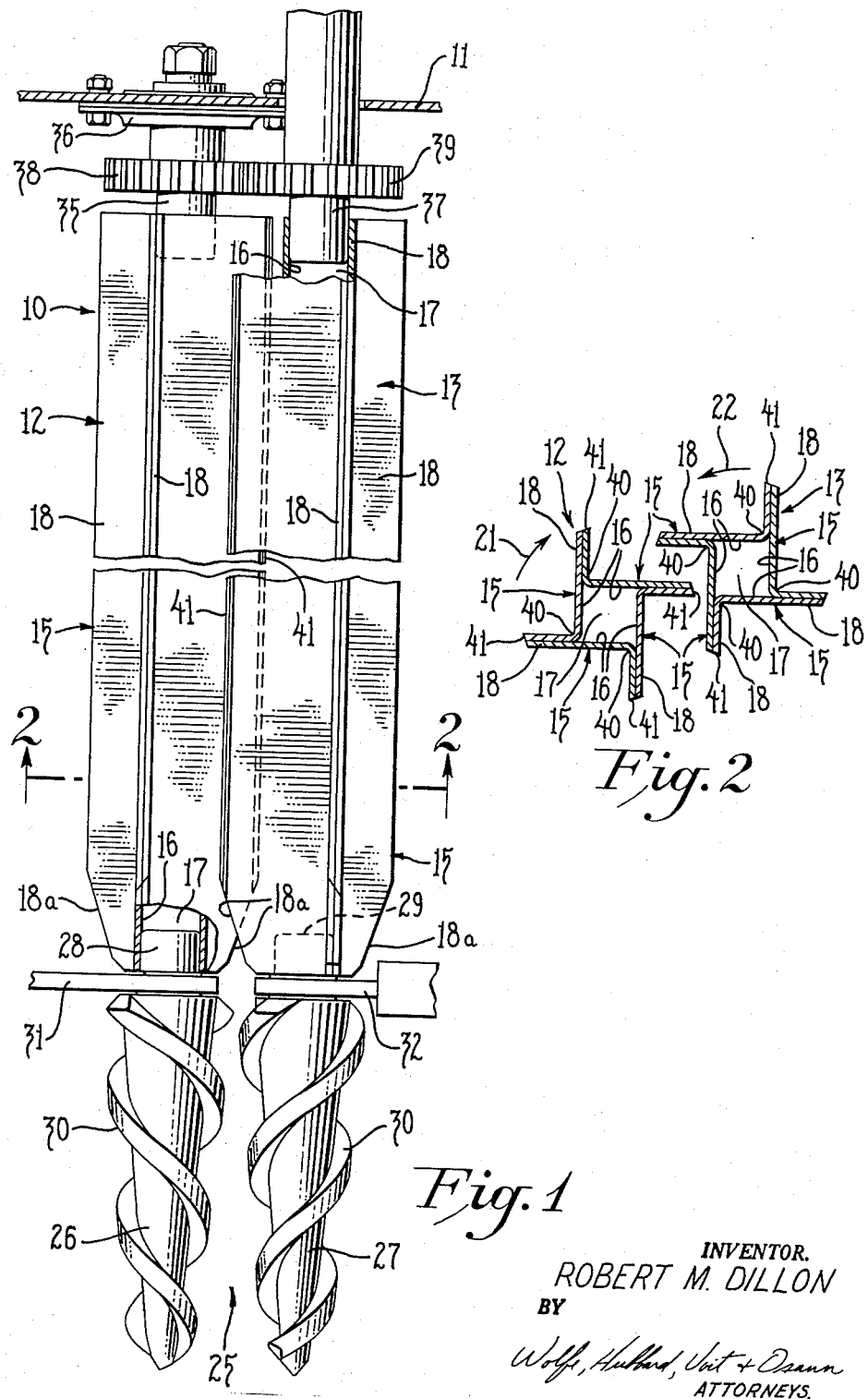

3,100,491
SNAPPING ROLLS FOR CORN PICKING APPARATUS
Robert M. Dillon, Cooksville, Ontario, Canada, assignor to Massey-Ferguson Limited, Toronto, Ontario, Canada, a corporation of Canada
Filed Sept. 22, 1961, Ser. No. 140,076
3 Claims. (Cl. 130—5)

The present invention relates to corn picking apparatus and more particularly concerns snapping rolls for use in such apparatus.

Present day corn pickers conventionally include pairs of snapping rolls defining a throat which is brought into alinement with the row of corn to be picked. The rolls are oppositely rotated as the machine is driven along the corn row so that the stalks are gripped and pulled downwardly. This draws the ears of corn past snapping plates which engage the ears to snap them from the stalks.

Snapping rolls are usually well over several feet in length and must be rigid and strong to function properly. In addition, they are normally provided with longitudinally running ridges of flutes so as to better grip the stalks. In view of these requirements, it has been conventional to form snapping rolls as integral castings despite the relatively higher cost and resulting weight of cast parts as compared with other fabrication methods.

Accordingly, it is the primary aim of the present invention to provide an improved snapping roll assembly which is less expensive to manufacture and lighter in weight than conventional rolls, without sacrificing strength or rigidity.

Moreover, it is an object of the invention to provide a snapping roll assembly as characterized above that gives an improved, more positive stalk gripping action as compared to prior types of rolls without danger of completely severing the stalks.

Other objects and advantages of the invention will become apparent upon reading the following detailed description and upon reference to the drawing, in which:

FIGURE 1 is a plan view, partially in section, of a snapping roll assembly embodying the invention; and FIG. 2 is a section taken approximately along the line 2—2 in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawing, there is shown in FIG. 1 a snapping roll assembly 10 mounted in a frame 11 of a corn picking apparatus not otherwise illustrated. The assembly 10 includes a pair of adjacent snapping rolls 12 and 13 embodying the invention and journalled for rotation in the frame 11.

In accordance with the invention, each of the rolls 12, 13 includes elongated plates 15 bent longitudinally into substantially L-shaped cross section and disposed with their outer surfaces 16 in abutment to define a hollow body 17 with spaced longitudinal flanges 18 constituting peripheral extensions of the sides of the body 17. It will be noted that the plates 15 are arranged so that there are left and right hand rolls 12, 13, with the flanges 18 of the respective rolls pointing generally in the directions of roll rotation as indicated by the arrows 21 and 22 in FIG. 2.

In the preferred construction, each of the rolls 12, 13 includes four of the plates 15 arranged so that the bodies 17 are square in cross section. The plates 15 are rigidly secured to one another by spot welding at a plurality of points along the flanges 18.

To define a throat 25 for the cooperating rolls 12, 13, the rolls include generally conical auger tips 26 and 27 having stub portions 28 and 29, respectively, which are fitted into the bodies 17 of the respective rolls 12, 13. The tips 26, 27 are formed with oppositely wound threads or ridges 30 so as to guide and pull the cork stalks to be picked between the rolls 12, 13. A pair of brackets 31 and 32 surround the stub portions 28, 29, respectively, between the plates 15 and the threads 30 so as to journal the forward ends of the rolls 12, 13. To facilitate entrance of the stalks between the flanges 18 of the rolls 12, 13, the flanges are formed with cut-back portions 18a which roughly form continuations of the tapered lines defined by the auger tips 26, 27.

For driving the rolls, a stub shaft 35 is fitted into the body 17 of the roll 12 and is supported by a bearing 36 mounted in the frame 11. A drive shaft 37 is fitted into and secured within the body 17 of the roll 13. A pair of intermeshed gears 38 and 39 are secured, respectively, to the stub shaft 35 and the drive shaft 37. The shaft 37 is driven from the power source of the corn picking apparatus and the gears 38, 39, having the same pitch diameter, assure opposite and uniform rotation of the rolls 12, 13 in the direction of the arrows 21, 22.

It is important to note that the rolls 12, 13 are phased so that their flanges 18 are received within the outer surfaces 40 of the bent plates 15 forming the opposite roll. Thus, the relatively sharp flanges 18 have nothing to act against when engaging the corn stalks and, therefore, the stalks are not severed by the flanges. Preferably, the edges of the flanges 18 are angled so as to define blade-like gripping edges 41. This causes the flanges 18 to dig into the corn stalks as the stalks move between the oppositely rotating rolls but, since the edges 41 are phased to be received within the inner surfaces 40 on the opposite roll, complete severance of the stalks is avoided.

It can now be seen that a particularly economical and lightweight snapping roll construction has been provided. The L-shaped plates 15, assembled and secured together in the manner described above, produce a particularly rigid and strong unit with the flanges 18, which actually contact the stalks being picked, being formed of double thicknesses of the material forming the plates 15. The open construction producing the hollow bodies 17 produces substantially rigidity and strength with a minimum amount of material.

I claim as my invention:

1. For use in a corn picking apparatus, the combination comprising a pair of adjacent snapping rolls journalled for rotation, each of said rolls including substantially rigid, elongated plates bent longitudinally into substantially L-shaped cross section and disposed with their outer surfaces in abutment to define a hollow body with spaced longitudinal flanges constituting peripheral extensions of the sides of said body, means coupling said rolls for uniform and opposite rotation, said rolls being phased so that said flanges on the rolls are received within the inner surfaces of the plates forming the opposite roll as the rolls are rotated.

2. For use in a corn picking apparatus, the combination comprising a pair of adjacent snapping rolls journalled for rotation, each of said rolls including four substantially rigid, elongated plates bent longitudinally into L-shaped cross section and disposed with their outer surfaces in abutment to define a square body with spaced longitudinal flanges constituting peripheral extensions of the sides of said body, the edges of said flanges being angled to define blade-like gripping edges, means coupling said rolls for uniform and opposite rotation, said rolls being phased so that said flanges on the rolls are received within the inner surfaces of the plates forming the opposite roll as the rolls are rotated.

3. A snapping roll for a corn picking apparatus comprising, in combination, four elongated plates bent longitudinally into L-shaped cross section and disposed with their outer surfaces in abutment to define a substantially rigid, square hollow body with spaced longitudinal flanges constituting peripheral extensions of the sides of said body, a drive shaft fitted into one end of said body, and an auger tip fitted into the opposite end of said body.

References Cited in the file of this patent

UNITED STATES PATENTS

| | | |
|---|---|---|
| 61,823 | Farnum et al. | Feb. 5, 1867 |
| 2,084,935 | Bott | June 22, 1937 |
| 2,604,750 | Fergason | July 29, 1952 |
| 2,656,667 | Smith et al. | Oct. 27, 1953 |